(12) United States Patent
Katayama

(10) Patent No.: US 12,401,069 B2
(45) Date of Patent: Aug. 26, 2025

(54) ALL-SOLID BATTERY MODULE AND ELECTRONIC APPARATUS

(71) Applicant: MURATA MANUFACTURING CO., LTD., Kyoto (JP)

(72) Inventor: Motoki Katayama, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 526 days.

(21) Appl. No.: 17/939,099

(22) Filed: Sep. 7, 2022

(65) Prior Publication Data

US 2023/0042606 A1 Feb. 9, 2023

Related U.S. Application Data

(63) Continuation of application No. PCT/JP2021/009061, filed on Mar. 8, 2021.

(30) Foreign Application Priority Data

Mar. 12, 2020 (JP) .................. 2020-043166

(51) Int. Cl.
*H01M 10/42* (2006.01)
*H01M 10/44* (2006.01)

(52) U.S. Cl.
CPC ......... *H01M 10/425* (2013.01); *H01M 10/44* (2013.01); *H01M 2220/30* (2013.01)

(58) Field of Classification Search
CPC . H01M 10/425; H01M 10/44; H01M 10/0564
See application file for complete search history.

(56) References Cited

U.S. PATENT DOCUMENTS

2019/0252727 A1 8/2019 Shimizu et al.

FOREIGN PATENT DOCUMENTS

| JP | H0950826 A | 2/1997 |
| WO | 2010047255 A1 | 4/2010 |
| WO | 2018092370 A1 | 5/2018 |

OTHER PUBLICATIONS

International Search Report of corresponding PCT application PCT/JP2021/009061, dated May 11, 2021.
Japanese Office Action issued Dec. 26, 2023 in corresponding Japanese Application No. 2022-507190.
Japanese Office Action issued Sep. 5, 2023 in corresponding Japanese Application No. 2022-507190.

*Primary Examiner* — Sarah A. Slifka
(74) *Attorney, Agent, or Firm* — K&L Gates LLP

(57) ABSTRACT

Provided is an all-solid-state battery module including: an all-solid-state battery with a voltage in excess of 0 V; a switching element connected in series with the all-solid-state battery; a control unit that controls on/off of the switching element; and a trigger input path connected to the control unit, where a trigger that causes the switching element to transition to an on state is input via the trigger input path.

12 Claims, 10 Drawing Sheets

ALL-SOLID BATTERY MODULE AND ELECTRONIC APPARATUS

TECHNICAL FIELD

The present invention relates to an all-solid-state battery module and an electronic device.

BACKGROUND ART

In recent years, research and development on all-solid-state batteries have been actively conducted. The all-solid-state battery has the advantages of: being easily packed in that the battery can be directly mounted by reflow or the like; and being smaller in the space required at the time of incorporation into the main body as compared with a conventional lithium ion battery. When the all-solid-state battery with a voltage is mounted by reflow together with other components, however, it is difficult to control the timing at which the solder paste is melted, and it is difficult to control the order of connections between the components. For this reason, depending on the mode of the connection by reflow, the electric power of the all-solid-state battery is unnecessarily supplied to a circuit component such as an IC (Integrated Circuit), and as a result, the circuit component may possibly undergo a destruction, a malfunction, a short circuit, or the like. For avoiding such a problem, it is conceivable to apply the technique of mounting a battery discharged to 0 V on a board, described in Patent Document 1 below.

PRIOR ART DOCUMENT

Patent Document

Patent Document 1: International Publication No. WO 2007/086289

SUMMARY OF THE INVENTION

Problem to be Solved by the Invention

In the case of applying the technique described in Patent Document 1, however, there is a need to deeply discharge the all-solid-state battery, and the all-solid-state battery may be possibly deteriorated. In addition, there is a need to charge the all-solid-state battery mounted on the board, thus causing an increase in manufacturing process, and a restriction on the manufacturing process. For this reason, the all-solid-state battery with a voltage can be desirably mounted on the board without causing the problems described above.

Accordingly, an object of the present invention is to provide an all-solid-state battery module and an electronic device that are capable of mounting an all-solid-state battery with a voltage on a board.

Means for Solving the Problem

The present invention provides an all-solid-state battery module including: an all-solid-state battery with a voltage in excess of 0 V; a switching element connected in series with the all-solid-state battery; a control unit that controls on/off of the switching element; and a trigger input path connected to the control unit, where a trigger that causes the switching element to transition to an on state is input via the trigger input path.

In addition, the present invention provides an electronic device including an all-solid-state battery module mounted on a circuit board, where the all-solid-state battery module includes: an all-solid-state battery with a voltage in excess of 0 V; a switching element connected in series with the all-solid-state battery; a first control unit that controls on/off of the switching element; and a trigger input path connected to the first control unit, and a trigger that causes the switching element to transition to an on state is input via the trigger input path, the electronic device further including on the circuit board: a second control unit; and an input/output line of the all-solid-state battery.

Advantageous Effect of the Invention

According to at least an embodiment of the present invention, an all-solid-state battery with a voltage can be mounted on a board without adversely affecting the other electronic components mounted together. It is to be noted that the contents of the present invention are not to be construed as being limited by the effects illustrated in this specification.

MODE FOR CARRYING OUT THE INVENTION

Hereinafter, embodiments and the like of the present invention will be described with reference to the drawings. It is to be noted that the description will be provided in the following order.
<First Embodiment>
<Second Embodiment>
<Modification Example>
<Application Example>

The embodiment and the like described below are preferred specific examples of the present invention, and the contents of the present invention are not to be considered limited to the embodiments and the like.

First Embodiment

[All-Solid-State Battery Module]

Figure 1A:
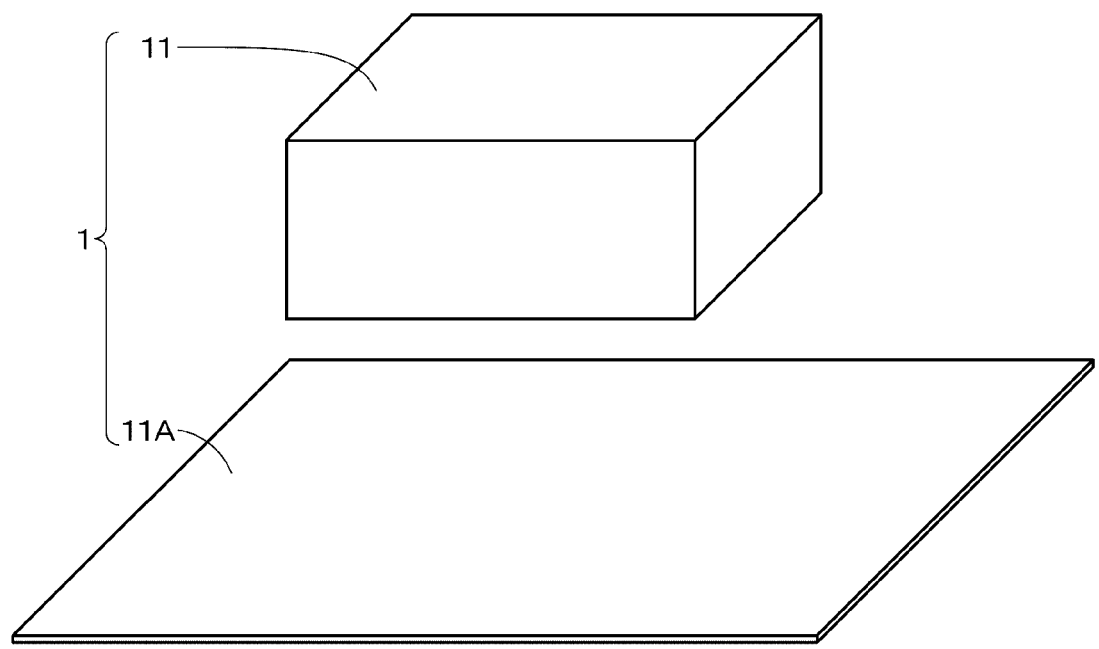
FIG. 1A is a diagram for illustrating an all-solid-state battery module according to a first embodiment.
Figure 1B:
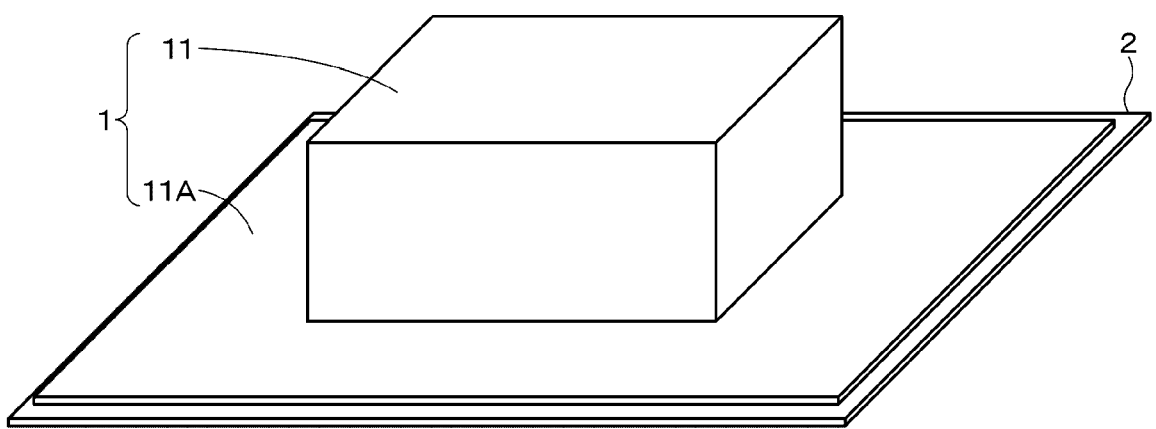
FIG. 1B is a diagram illustrating the all-solid-state battery module according to the first embodiment, mounted on a circuit board.

FIG. 1A shows an example of an all-solid-state battery module (all-solid-state battery module 1) according to the present embodiment, and FIG. 1B is a diagram illustrating the all-solid-state battery module 1 mounted on a circuit board (circuit board 2). As illustrated in FIG. 1A, the all-solid-state battery module 1 includes an all-solid-state battery 11 and a circuit board 11A on which the all-solid-state battery 11 is mounted.

Figure 2:
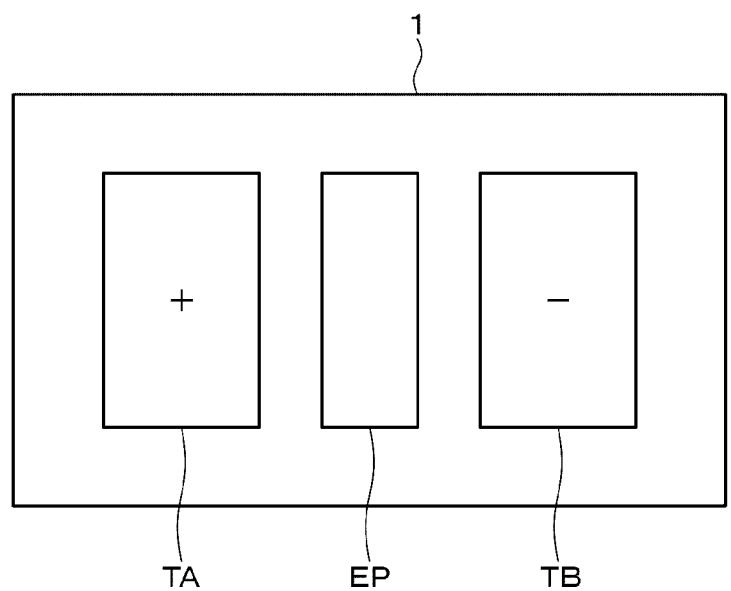
FIG. 2 is a diagram illustrating a positive electrode terminal and the like included in the all-solid-state battery module according to the first embodiment.

As illustrated in FIG. 2, the all-solid-state battery module 1 includes a positive electrode terminal TA, a negative electrode terminal TB, and an enabling pin EP. The positive electrode terminal TA, the negative electrode terminal TB, and the enabling pin EP are led out from appropriate sites of the all-solid-state battery module 1.

Figure 3:
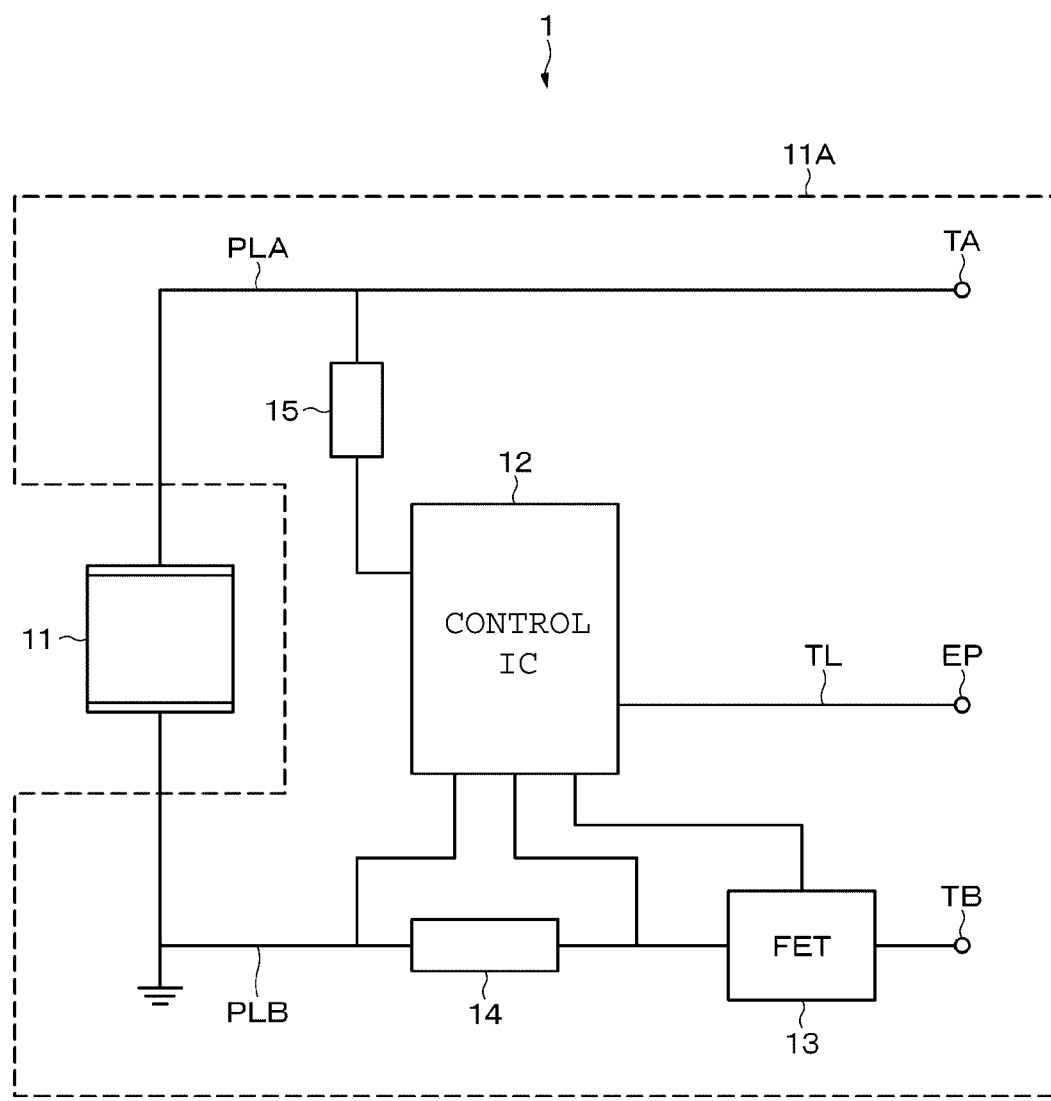
FIG. 3 is a diagram illustrating a configuration example of an all-solid-state battery module according to the first embodiment.

A configuration example of the all-solid-state battery module 1 will be described in detail with reference to FIG. 3. The all-solid-state battery module 1 includes the all-solid-state battery 11 and the circuit board 11A on which the all-solid-state battery 11 is mounted. The configuration illustrated in FIG. 3 is mounted on the circuit board 11 A with a predetermined connection pattern. A power line PLA is connected to a positive electrode of the all-solid-state battery 11, and the positive electrode terminal TA is led out via the power line PLA. In addition, a power line PLB is connected to a negative electrode of the all-solid-state battery 11, and the negative electrode terminal TB is led out via the power line PLB.

In addition, the all-solid-state battery module 1 includes a control IC 12, which is an example of a control unit or a first control unit, an FET (Field Effect Transistor) 13, a current detection resistor 14, and a resistor 15. A trigger input path TL is connected to a predetermined port of the control IC 12, and the enabling pin EP is led out via the trigger input path TL.

Examples of the all-solid-state battery 11 include metal ion all-solid-state batteries such as a lithium ion all-solid-state battery, a sodium ion all-solid-state battery, and a calcium ion all-solid-state battery. According to the present embodiment, an all-fixed battery that has a known structure or a known material can be applied as the all-solid-state battery 11. As illustrated in FIG. 1A, the all-solid-state battery 11 according to the present embodiment is a surface-mounted battery mounted on the circuit board 11A. It is to be noted that the all-solid-state battery according to the present specification refers to a secondary battery including at least a solid electrolyte layer, and there is not necessarily a need for all of the configurations of the secondary battery to be solid.

The control IC 12 controls the all-solid-state battery module 1. The control IC 12 controls on/off of the FET 13, for example. In addition, the control IC 12 transmits a measurement result such as a current value, detected via the current detection resistor 14, to an upper-level protection IC or the like. It is to be noted that the control IC 12 operates with electric power obtained by appropriately converting the electric power of the all-solid-state battery 11 as a power supply.

The FET 13 is a switching element whose on/off is controlled by the control IC 12. It is to be noted that although details will be described later, the FET 13 is set to an off state so as to limit the power of the all-solid-state battery 11 at the time of mounting the all-solid-state battery module 1.

The current detection resistor 14 is a resistor for detecting a current value flowing through the current path of the all-solid-state battery module 1. For example, the control IC 12 detects the current value, based on the voltage value generated across both ends of the current detection resistor 14. The detected current value is transmitted to an upper-level IC (for example, a protection IC to be described later). It is to be noted that according to the present embodiment, the current detection resistor 14 is connected on the power line PLB, but may be connected on the power line PLA.

The resistor 15 is connected between the power line PLA and a predetermined port of the control IC 12. The current input to the control IC 12 is limited by the resistor 15.

Configuration Example of Electronic Device

Figure 4:
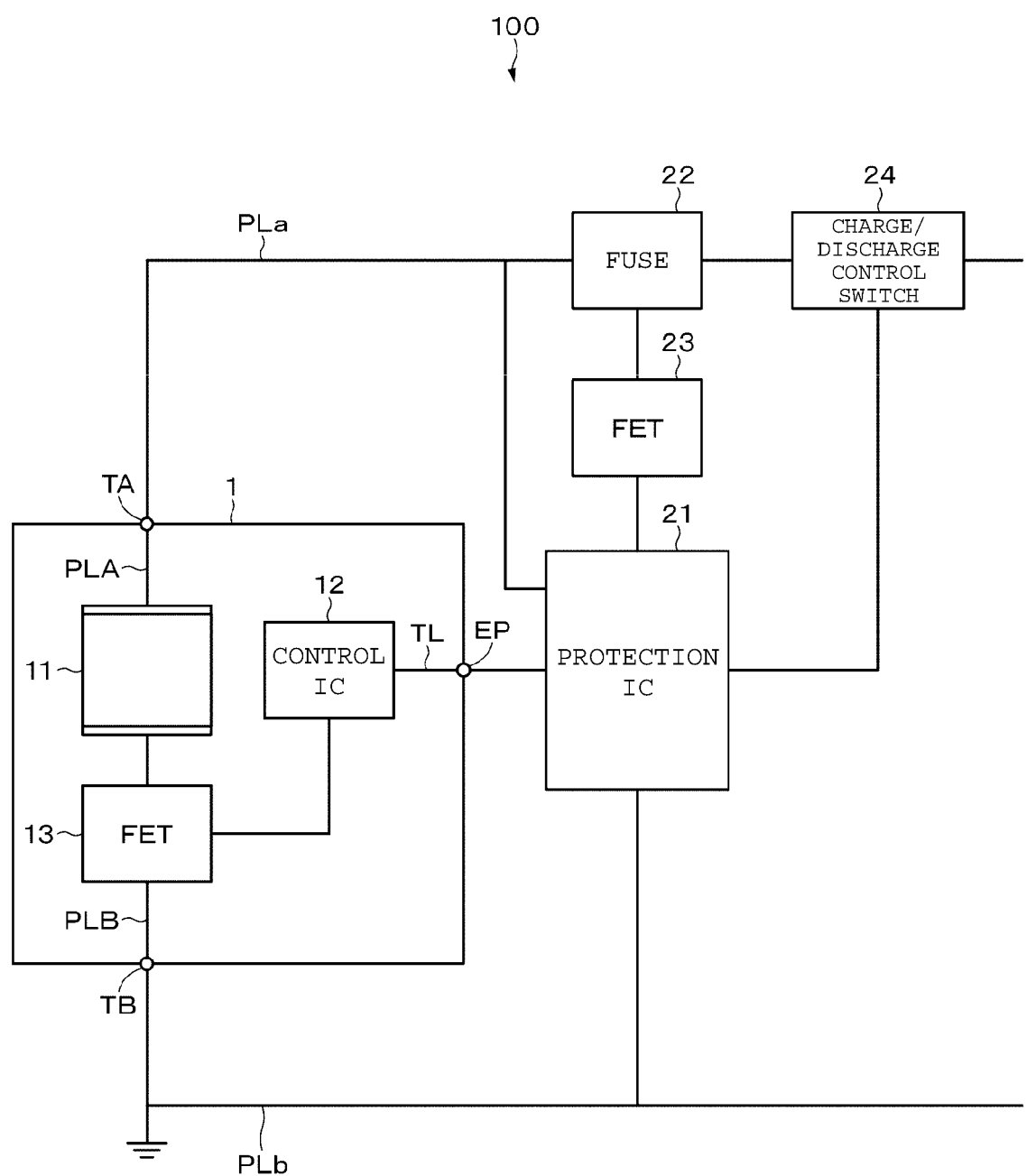
FIG. 4 is a diagram illustrating a configuration example of an electronic device to which the all-solid-state battery module according to the first embodiment is applied.

FIG. 4 is a diagram illustrating a configuration example of an electronic device (electronic device 100) that has a configuration with the above-described all-solid-state battery module 1 mounted on the circuit board 2. It is to be noted that a part of the illustration for the configuration of the all-solid-state battery module 1 is simplified in FIG. 4.

A power line PLa is led out from the positive electrode side of the all-solid-state battery module 1. The power line PLa is connected to the power line PLA via the positive electrode terminal TA. In addition, a power line PLb is led out from the negative electrode side of the all-solid-state battery module 1. The power line PLb is connected to the power line PLB via the negative electrode terminal TB. According to the present embodiment, the power line PLa and the power line PLb correspond to input/output lines of the all-solid-state battery 11.

In addition, the electronic device 100 includes a protection IC 21, which is an example of a second control unit, a fuse 22, an FET 23, and a charge/discharge control switch 24.

The protection IC 21 performs a protection operation in the electronic device 100. A specific example of the protection operation will be described later. In addition, the protection IC 21 is connected to the control IC 12 of the all-solid-state battery module 1 via a predetermined communication line (not shown), and is allowed to exchange, via the communication line, data (for example, a current value) measured in the all-solid-state battery module 1 and various commands. In addition, the protection IC 21 is connected to the trigger input path TL via the enabling pin EP. Such a configuration allows the protection IC 21 to supply a high-level (Hi) or low-level (Lo) signal in a logical sense to the control IC 12 via the trigger input path TL.

The fuse 22 is connected on the power line PLa, for example. As the fuse 22, for example, an SCP (Self Control Protector) can be applied. The SCP is a fuse with a heater, which is a device that heats the heater with electric power of a battery (in this example, the all-solid-state battery 11) to cut off the fuse. The fuse can be cut off at any timing by changing the timing of supplying electric power to the heater.

The FET 23 is a switching element connected between the fuse 22 and the protection IC 21. The on/off of the FET 23 is controlled by the protection IC 21. The FET 23 is turned on, thereby overheating the heater of the fuse 22, and then fusing the fuse 22.

The charge/discharge control switch 24 is a switch whose on/off is controlled by the protection IC 21. The charge/discharge control switch 24 includes a charge control switch and a discharge control switch, not shown. The charge control switch and the discharge control switch are appropriately turned on/off, thereby permitting or prohibiting each of charge and discharge. As the charge/discharge control switch 24, for example, an FET can be used. It is to be noted that the charge/discharge control switch 24 is connected on the power line PLa according to the present embodiment, but may be connected on the power line PLb.

[Operation of Electronic Device]

Example of Protection Operation

Next, an example of the main operation of the electronic device 100 will be described. First, the protection operation performed in the electronic device 100 will be described. The protection IC 21 appropriately turns on/off the charge/discharge control switch 24 to function as a charge/discharge control unit that controls charge/discharge. For example, when the protection IC 21 determines that the all-solid-state battery 11 without any abnormality or the like can be charged and discharged without any trouble, the protection IC 21 turns on the charge control switch and the discharge switch. In addition, the protection IC 21 turns off at least the charge control switch when it is necessary to prohibit charging, for example, when the voltage of the all-solid-state battery 11 reaches the overcharge prohibition voltage. In addition, the protection IC 21 turns off at least the discharge control switch when it is necessary to prohibit discharging, for example, when the voltage of the all-solid-state battery 11 reaches the overdischarge prohibition voltage. In addition, the protection IC 21 turns off the charge control switch and the discharge control switch to stop charging and discharging when the all-solid-state battery 11 is deeply discharged to reach the recharge prohibition region. It is to be noted that the protection IC 21 may perform another known protection operation such as an overcurrent detection.

(Operation Related to Power Control)

Next, an operation related power control according to the present embodiment will be described. According to the present embodiment, a process of charging the all-solid-state battery 11 without any voltage (hereinafter, appropriately referred to as initial charging) is performed as a process of making the all-solid-state battery 11 usable as a battery, that is, a process of activating the all-solid-state battery 11, before the all-solid-state battery module 1 is mounted on the circuit board 2 by reflow or the like. The initial charging is performed by, for example, turning on the FET 13 with the use of a manufacturing device or the like and then connecting a charging device to the positive electrode terminal TA and the negative electrode terminal TB. Because the charging is performed, the control IC 12 is in an operable state (active state).

When the all-solid-state battery module 1 is mounted on the circuit board 2 with the all-solid-state battery 11 charged to a voltage in excess of 0 V, however, it is not known which site is connected first with a solder, which may thus possibly cause a short circuit or a malfunction of an electronic component such as an IC at the time of reflow. Thus, at the time of reflow, the FET 13 is turned off, thereby keeping the electric power of the all-solid-state battery 11 from being output. As a result, the short circuit and the like are prevented from being caused.

In contrast, a process of turning the FET 13 from the off state to the on state is performed at an appropriate timing (for example, timing of board inspection) after the reflow such that the all-solid-state battery module 1 is allowed to be used. The control IC 12 causes the FET 13 to transition from the off state to the on state in response to the input of a trigger for causing the FET 13 to transition to the on state.

The trigger is, for example, a high-level or low-level signal, and is provided to the all-solid-state battery module 1 from the outside of the all-solid-state battery module 1. The trigger is output from the protection IC 21, for example, and input to the control IC 12 via the trigger input path TL.

For example, the control IC 12 detects a change in a logical level in the input to its own port to which the trigger input path TL is connected, thereby recognizing the input of the trigger. More specifically, for example, after the all-solid-state battery module 1 that has the configuration illustrated in FIG. 4 is mounted on the circuit board 2 by reflow or the like, the protection IC 21 is activated by inputting a predetermined voltage to the protection IC 21 once (one shot) at the timing of board inspection or the like. The activated protection IC 21 provides a high-level or low-level signal as a trigger to the control IC 12, based on a program stored in advance. The control IC 12 that has detected the input of such a signal causes the FET 13 set to the off state to transition to the on state. Subsequently, the power of the all-solid-state battery module 1 is not limited, and can be supplied to an appropriate load.

Figure 5:
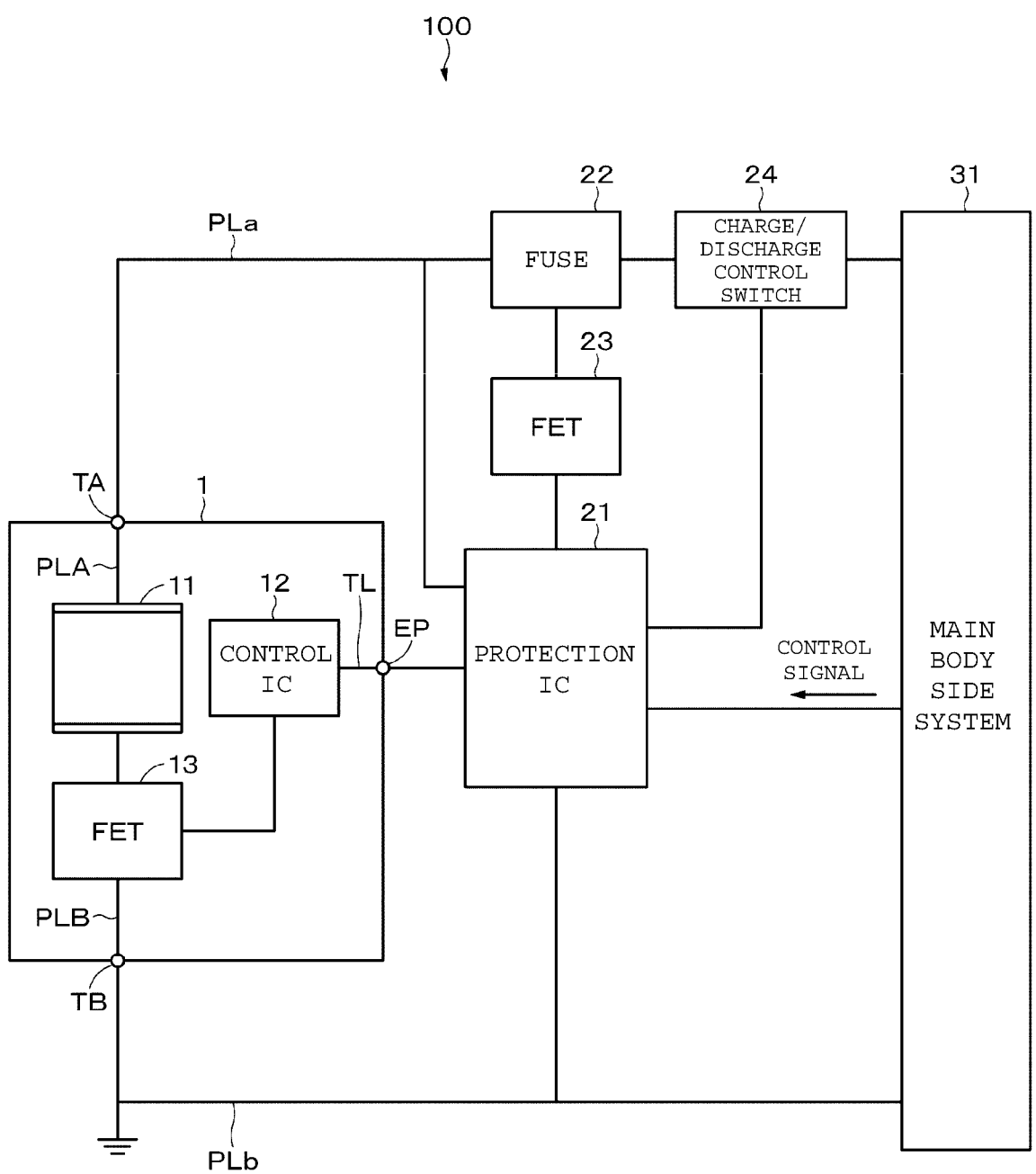
FIG. 5 is a diagram referred to in the description of another example of a trigger supply source.

It is to be noted that, depending on the configuration of the electronic device 100, the protection IC 21 may be connected to an upper-level host device on the main body side (hereinafter, appropriately referred to as a main body-side system). In this case, for example, as illustrated in FIG. 5, a control signal for outputting a trigger is transmitted from a main body-side system 31 (an example of an electronic device-side control unit) to the protection IC 21. The protection IC 21 that has received such a control signal transmits a high-level or low-level signal to the control IC 12 via the trigger input path TL. Then, the control IC 12 turns on the FET 13.

Figure 6:
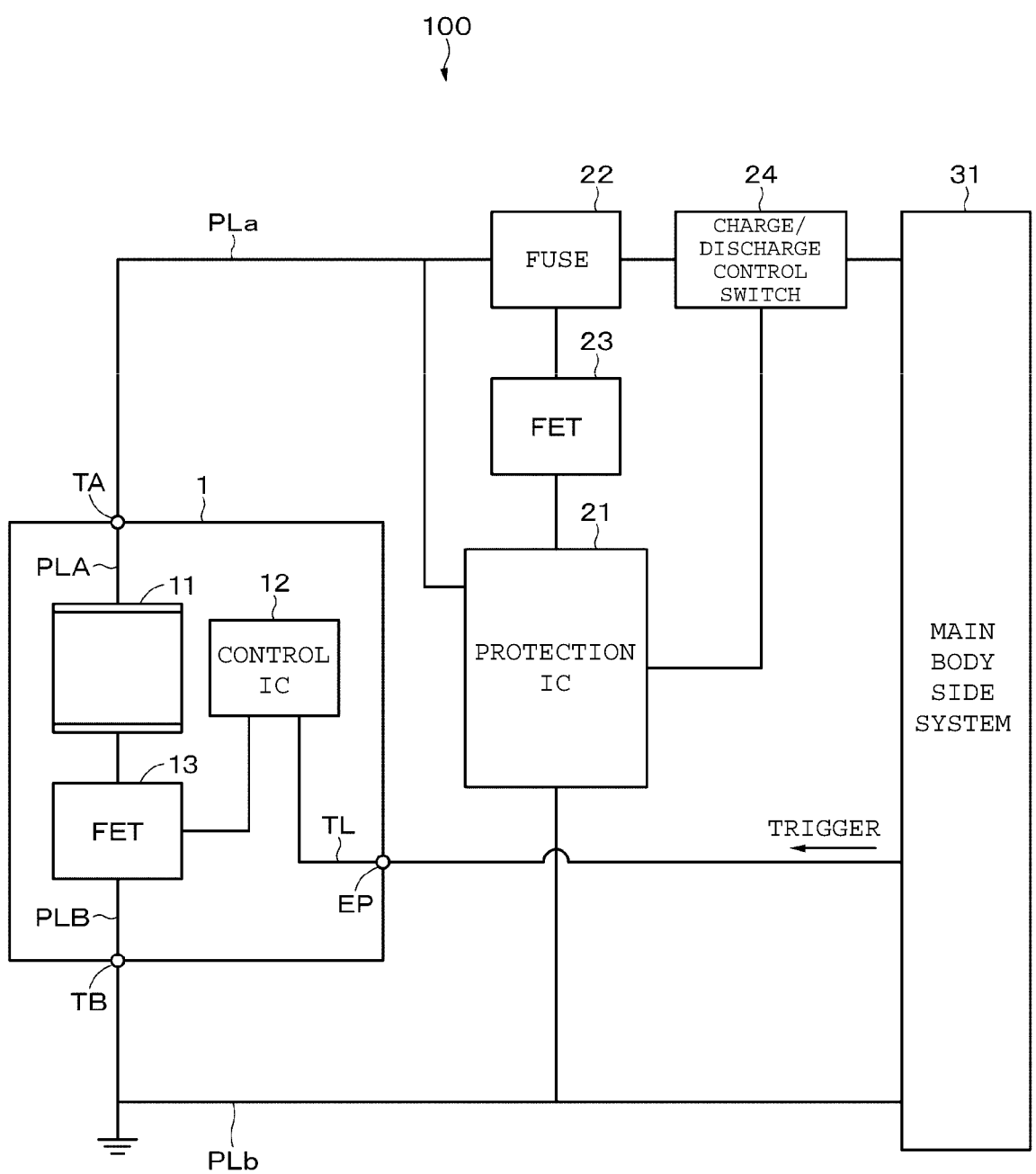
FIG. 6 is a diagram referred to in the description of another example of a trigger supply source.

In addition, as illustrated in FIG. 6, the enabling pin EP of the control IC 12 may be connected to the main body-side system 31 without the protection IC 21. Then, a high-level or low-level signal may be transmitted directly from the main body-side system 31 to the control IC 12 via the trigger input path TL. According to the present example, in a case where the protection IC 21 fails to output the trigger to the control IC 12 for some reason, the trigger can be output from the main body-side system 31 to the control IC 12, and the FET 13 can be thus reliably turned on.

Advantageous Effect

According to the present embodiment described above, for example, the following effects can be obtained.

The all-solid-state battery module can be mounted in which the all-solid-state battery has a voltage in excess of 0 V, thus eliminating the need to deeply discharge the all-solid-state battery before reflow or the like, and allowing the all-solid-state battery to be prevented from being deteriorated. In addition, the need to initially charge the all-solid-state battery after reflow is eliminated.

The power of the all-solid-state battery is limited at the time of mounting by reflow or the like, thus allowing the other electronic components to be prevented from being adversely affected due to the electric power of the all-solid-state battery.

In addition, conventionally, there has been a process restriction in that an all-solid-state battery module including an all-solid-state battery with a voltage in excess of 0 V is finally mounted on a circuit board, but according to the present invention, these process restrictions will not be caused.

After mounting the all-solid-state battery module, the electric power of the all-solid-state battery can be reliably supplied to the outside.

Modification Example of First Embodiment

It is to be noted that while an example in which the electronic device 100 includes one all-solid-state battery module 1 has been described in the foregoing description, the electronic device 100 may include a plurality of all-solid-state battery modules 1. The plurality of all-solid-state battery modules 1 are connected in series, for example. The control IC 12 and the protection IC 21 are connected for each of the plurality of all-solid-state battery modules 1, and a trigger is provided from the protection IC 21 to each control IC 12, as in the above-described embodiment. Each control IC 12 turns on the corresponding FET 13. It is to be noted that a trigger may be given from the main body-side system 31 to each control IC 12.

Second Embodiment

Next, a second embodiment will be described. It is to be noted that in the description of the second embodiment, the identical or same configurations in foregoing the description are denoted by the same reference numerals, and redundant descriptions thereof will be appropriately omitted. In addition, unless otherwise specified, the matters described in the first embodiment can be applied to the second embodiment.

Schematically, the second embodiment differs from the first embodiment in that the supply source for a trigger is not an IC or the like. More specifically, the second embodiment is an embodiment in which a predetermined disconnection part is physically connected with a solder or the like to provide a trigger to the control IC 12.

Figure 7:
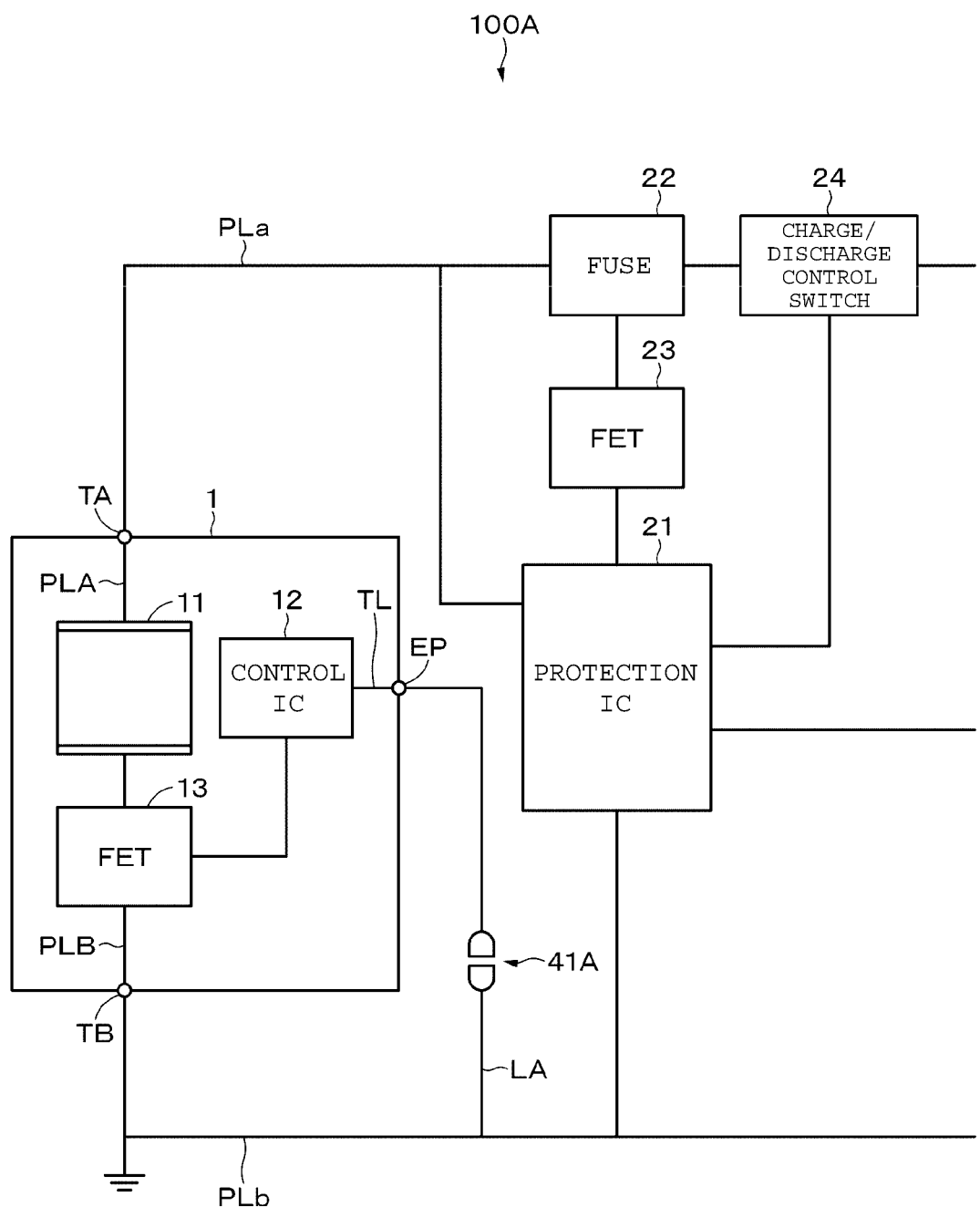
FIG. 7 is a diagram illustrating a configuration example of an all-solid-state battery module according to a second embodiment.

FIG. 7 is a diagram illustrating a configuration example of an electronic device (electronic device 100A) according to the second embodiment. The electronic device 100A differs from the electronic device 100 illustrated in FIG. 4 in that the trigger input path TL is not connected to the protection IC 21, the trigger input path TL is connected to an input/output line (in the present example, the power line PLb) via the enabling pin EP and the line LA, and a disconnection part 41A that is electrically disconnectable with a predetermined space is formed on the line LA. The disconnection part 41A is formed outside the all-solid-state battery module 1, and has, as a specific example, two lands (also referred to as split lands or the like) that can be physically connected by soldering.

As in the first embodiment, the all-solid-state battery module 1 that has the FET 13 in the off state and includes the all-solid-state battery 11 with a voltage in excess of 0 V is mounted on the circuit board 2 by reflow or the like. In this state, the disconnection part 41A is not yet electrically connected, and the state of the port of the control IC 12, to which the trigger input path TL is connected, is "undetermined" as a logical level. Then, after the reflow, a conductive member made of a metal such as a solder is disposed on the disconnection part 41A, thereby electrically connecting and short-circuiting the trigger input path TL and the power line PLb. As a result, the logical level (voltage) of the port of the control IC 12, to which the trigger input path TL is connected, is changed from "undetermined" to "low level (or high level)". The control IC 12 detects such a change in logical level to recognize that a trigger is provided from the outside to the control IC 12 itself. Then, in response to the trigger provided, the control IC 12 turns on the FET 13. As described, triggers other than the high-level or low-level signal may be used.

Figure 8:
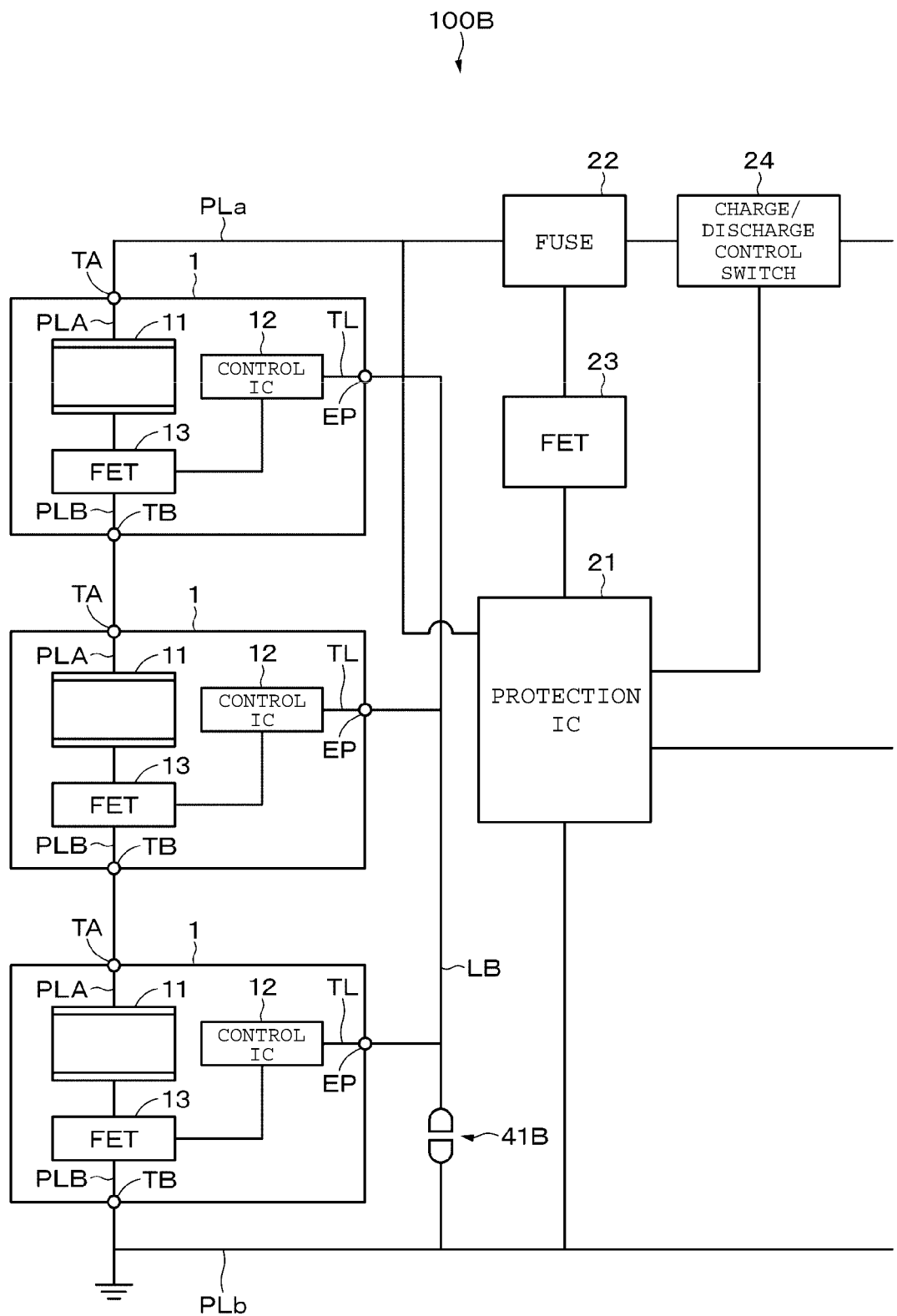
FIG. 8 is a diagram illustrating a modification example of an all-solid-state battery module according to the second embodiment.

Also in the present embodiment, a plurality of all-solid-state battery modules 1 may be used. FIG. 8 is a diagram illustrating a configuration example of an electronic device (electronic device 100B) according to a modification example the present embodiment. As illustrated in FIG. 8, the electronic device 100B includes, for example, three all-solid-state battery modules 1 connected in series. The trigger input path TL and enabling pin EP of each all-solid-state battery module 1 are connected to an input/output line (in this example, the power line PLb) for the three all-solid-state battery modules 1 via a line LB, which is an example of a connection part. In the present modification example, a disconnection part 41B is formed on the line LB. The line LB is a line that is common to the trigger input path TL and enabling pin EP of each all-solid-state battery module 1.

After the reflow, a conductive member containing a metal such as a solder is disposed on the disconnection part 41B, thereby electrically connecting and short-circuiting the trigger input path TL and the power line PLb. As a result, the logical level (voltage) of the port of each control IC 12, to which the trigger input path TL is connected, is changed from "undetermined" to "low level (or high level)". Each control IC 12 detects such a change in logical level to recognize that a trigger is provided from the outside to the control IC 12 itself. Then, in response to the trigger provided, each control IC 12 turns on the FET 13 in the same all-solid-state battery module 1. As a result, the electric power of the three all-solid-state battery modules 1 can be supplied from the electronic device 100B.

In order to lift the restriction on the power of the all-solid-state battery 11 of each all-solid-state battery module 1 after the reflow, there has been conventionally a need to provide the output path of each all-solid-state battery module 1 with a disconnection part and electrically connect the respective disconnection parts. More specifically, there has been a need to provide as many disconnection parts as the number of all-solid-state battery modules 1. According to the present modification example, however, it is only necessary to provide a disconnection part at a site, thus allowing for simplifying the step of electrically connecting the disconnection part, and allowing for reducing the area on the circuit board for providing the disconnection part.

Modification Example

While the embodiments of the present invention have been concretely described above, the contents of the present invention are not to be considered limited to the embodiments described above, and it is possible to make various modifications based on technical idea of the present invention.

In the embodiments described above, the control IC 12 may, when the FET 13 is turned on once, ignore and refuse to accept the trigger if the trigger is input via the trigger input path TL thereafter. As a result, the FET 13 can be prevented from being turned off again by the input to the enabling pin EP due to a noise or the like.

As the switching element, a transistor or an IGBT (Insulated Gate Bipolar Transistor) may be used instead of the FET. In addition, the disconnection part may be electrically connected by a jumper wire instead of soldering. The lines LA and LB may be connected to the power line PLa. In addition, without departing from the scope of the present invention, another configuration may be added to the all-solid-state battery module or the electronic device, or a predetermined configuration may be removed therefrom. In addition, the all-solid-state battery module and the electronic device may be also referred to as a name such as an all-solid-state battery pack or the like, depending on the application and the like, but the scope of the present invention should not be interpreted as being limited by the difference of such a name.

The matters described in the above-described embodiments and modification examples can be appropriately combined. In addition, the materials, processes, and the like described in the embodiments are considered merely by way of example, and the contents of the present invention are not to be considered limited to the exemplified materials or the like.

Application Example

The all-solid-state battery module according to the present invention can be used for mounting on various electronic devices, an electric tool, an electric vehicle, or the like, or for supplying electric power thereto.

Next, a specific application example will be described. For example, the above-described all-solid-state battery module can be used as a power supply for a wearable device that has the function of a portable information terminal, that is, a so-called wearable terminal. Examples of the wearable terminal include, but not to be considered limited thereto, a wristwatch-type terminal and a glasses-type terminal.

Figure 9:
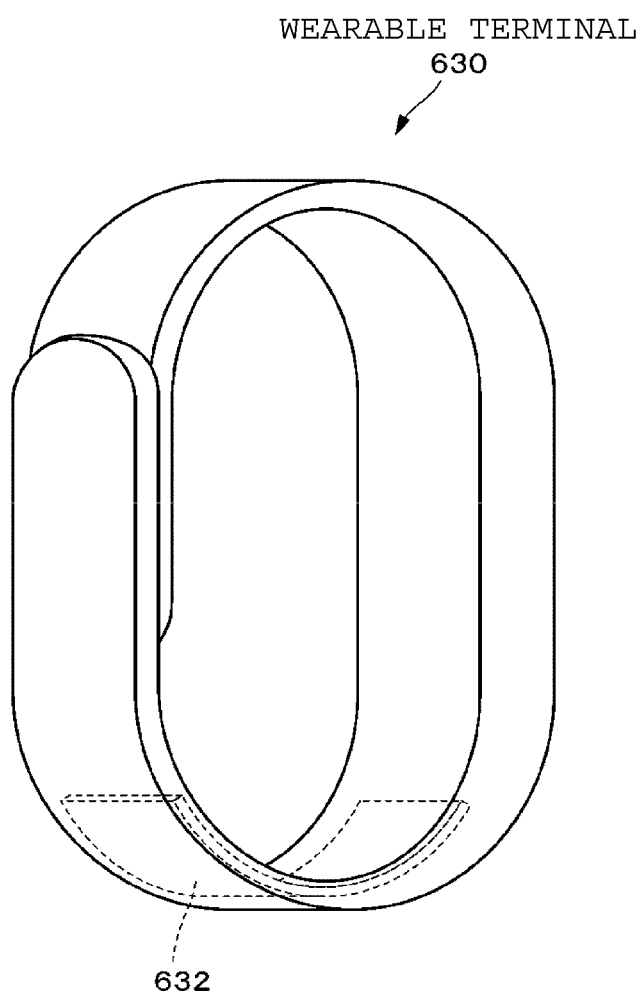
FIG. 9 is a diagram for illustrating an application example.

FIG. 9 illustrates an example of a wearable terminal that has a built-in all-solid-state battery module. As illustrated in FIG. 9, the wearable terminal 630 according to the application example is a wristwatch-type terminal, which includes therein a battery pack 632. The all-solid-state battery module according to the present invention can be applied as the battery pack 632. The wearable terminal 630 can be worn and then used by the user. The wearable terminal 630 may be a deformable flexible terminal.

Figure 10:
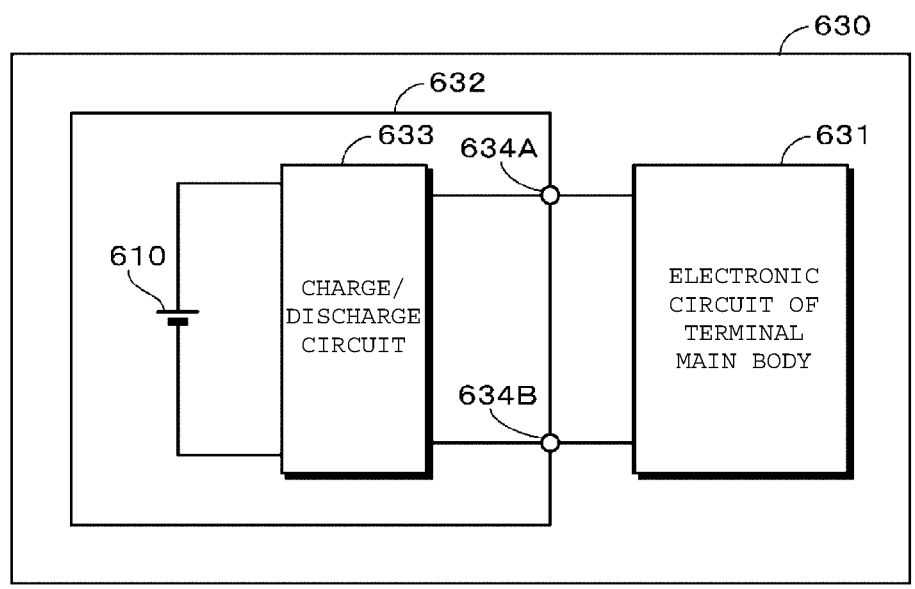
FIG. 10 is a diagram for illustrating an application example.

As illustrated in FIG. 10, the wearable terminal 630 according to the application example includes an electronic circuit 631 of an electronic device main body, and the battery pack 632. The battery pack 632 is electrically connected to the electronic circuit 631. The wearable terminal 630 has, for example, a configuration that allows the user to attach/detach the battery pack 632. It is to be noted that the configuration of the wearable terminal 630 is not limited thereto, and the battery pack 632 may be configured to be built in the wearable terminal 630 so that the user is not allowed to remove the battery pack 632 from the wearable terminal 630.

In the case of charging the battery pack 632, the positive electrode terminal 634A and negative electrode terminal 634B of the battery pack 632 are respectively connected to a positive electrode terminal and a negative electrode terminal of a charger (not shown). On the other hand, in the case of discharging the battery pack 632 (in the case of using the wearable terminal 630), the positive electrode terminal 634A and negative electrode terminal 634B of the battery pack 632 are respectively connected to a positive electrode terminal and a negative electrode terminal of the electronic circuit 631.

Electronic Circuit

The electronic circuit 631 includes, for example, a CPU, a peripheral logic unit, an interface unit, a storage unit, and the like, and controls the wearable terminal 630.

Battery Pack

The battery pack 632 includes an all-solid-state battery cell 610 (all-solid-state battery 11 according to the embodiment) and a charge/discharge circuit 633.

While an example in which the all-solid-state battery module according to the present invention is applied as the battery pack 632 has been described in the present application example, the all-solid-state battery module according to the present idea may be mounted on the electronic circuit 631 of the electronic device main body.

DESCRIPTION OF REFERENCE SYMBOLS

1: All-solid-state battery module
11: All-solid-state battery
12: Control IC
13: FET
21: Protection IC
31: Main body-side system
41A, 41B: Disconnection part
100, 100A, 100B: Electronic device
PLA, PLa, PLB, PLb: Power line
EP: Enabling pin
TL: Trigger input path
LA, LB: Line

The invention claimed is:

1. An all-solid-state battery module comprising:
an all-solid-state battery with a voltage in excess of 0 V;
a switching element connected in series with the all-solid-state battery;
a control unit that controls on/off of the switching element; and
a trigger input path electrically connected to the control unit,
wherein a trigger that causes the switching element to transition to an on state is input via the trigger input path.

2. The all-solid-state battery module according to claim 1, wherein the all-solid-state battery is a surface-mounted battery mounted on a surface of a circuit board.

3. The all-solid-state battery module according to claim 1, wherein the trigger is a high-level signal or a low-level signal.

4. The all-solid-state battery module according to claim 1, wherein
when the switching element is turned on once, the control unit is configured to ignore and refuse to accept the trigger if the trigger is input via the trigger input path thereafter until the switching element returns to an off state.

5. An electronic device comprising an all-solid-state battery module mounted on a circuit board,
wherein
the all-solid-state battery module includes:
an all-solid-state battery with a voltage in excess of 0 V;
a switching element connected in series with the all-solid-state battery;
a first control unit that controls on/off of the switching element; and a trigger input path electrically connected to the first control unit, and a trigger that causes the switching element to transition to an on state is input via the trigger input path, the electronic device further comprising on the circuit board:

a second control unit; and an input/output line of the all-solid-state battery.

6. The electronic device according to claim 5, wherein the trigger is provided from outside the all-solid-state battery module.

7. The electronic device according to claim 5, wherein the trigger input path is electrically connected to the second control unit, and the trigger is output from the second control unit.

8. The electronic device according to claim 5, wherein a trigger output from an electronic device-side control unit is input to the first control unit via the trigger input path.

9. The electronic device according to claim 5, wherein a disconnection part that is electrically disconnectable with a predetermined space is provided between the trigger input path and the input/output line.

10. The electronic device according to claim 9, wherein the trigger input path and the input/output line are electrically connected by disposing a conductive member on the disconnection part.

11. The electronic device according to claim 5, comprising:

a plurality of the all-solid-state battery modules; and a connection part that connects the trigger input path of each of the plurality of all-solid-state battery modules and the input/output line, wherein the connection part is provided with a disconnection part that is electrically disconnectable with a predetermined space.

12. The electronic device according to claim 5, wherein when the switching element is turned on once, the first control unit is configured to ignore and refuse to accept the trigger if the trigger is input via the trigger input path thereafter until the switching element returns to an off state.

* * * * *